(12) United States Patent
Shangguan (10) Patent No.: US 11,472,017 B2
(45) Date of Patent: Oct. 18, 2022

(54) POWER TOOL

(71) Applicant: Globe (Jiangsu) Co., Ltd., Jiangsu (CN)

(72) Inventor: Yunjie Shangguan, Jiangsu (CN)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 391 days.

(21) Appl. No.: 16/717,443

(22) Filed: Dec. 17, 2019

(65) Prior Publication Data

US 2020/0198115 A1 Jun. 25, 2020

(30) Foreign Application Priority Data

Dec. 24, 2018 (CN) .......................... 201811581478.2

(51) Int. Cl.
| | |
|---|---|
| *B25F 5/02* | (2006.01) |
| *H02K 11/28* | (2016.01) |
| *H02K 7/14* | (2006.01) |

(52) U.S. Cl.
CPC ................. *B25F 5/02* (2013.01); *H02K 7/14* (2013.01); *H02K 11/28* (2016.01)

(58) Field of Classification Search
CPC ........... B25F 5/02; B25F 5/001; H02K 11/28; H02K 7/14
See application file for complete search history.

(56) References Cited

U.S. PATENT DOCUMENTS

| | | | | |
|---|---|---|---|---|
| 3,378,662 A * | 4/1968 | Sorenson | ............... | H01H 9/061 200/324 |
| 3,383,943 A * | 5/1968 | Piber | ...................... | H01H 13/08 200/522 |
| 3,548,136 A * | 12/1970 | Frenzel | ................... | H01H 13/08 200/327 |
| 3,603,757 A * | 9/1971 | Sahrbacker | ............ | H01H 9/061 200/522 |
| 3,761,663 A * | 9/1973 | Brown | ................... | H01H 9/061 200/327 |
| 4,180,716 A * | 12/1979 | Suzuki | ..................... | H01H 9/06 200/522 |
| 4,276,461 A * | 6/1981 | Piber | ...................... | H01H 9/061 200/522 |
| 4,998,589 A * | 3/1991 | Wiesendanger | ....... | H01H 9/061 408/9 |
| 5,215,049 A * | 6/1993 | Wolf | ................... | B27B 17/0008 261/64.6 |
| 5,414,793 A * | 5/1995 | Morikawa | .............. | H01H 9/061 200/332.2 |

(Continued)

FOREIGN PATENT DOCUMENTS

WO 2017192087 A1 11/2017

*Primary Examiner* — Nathaniel C Chukwurah
*Assistant Examiner* — Lucas E. A. Palmer
(74) *Attorney, Agent, or Firm* — Rooney IP, LLC (57) ABSTRACT

A power tool including a housing, a motor housed in the housing, and a handle formed on the housing, the handle being provided with a speed regulating mechanism for adjusting the rotational speed of the motor. A speed limiting mechanism cooperates with the speed regulating mechanism. The speed limiting mechanism includes a first knob and a second knob disposed on two sides of the handle. The first knob and the second knob are interlocked with each other to be toggled to limit the motor to operate at a fixed rotational speed.

9 Claims, 7 Drawing Sheets

(56) References Cited

U.S. PATENT DOCUMENTS

| | | | | |
|---|---|---|---|---|
| 5,685,271 A * | 11/1997 | Taomo | F02D 11/02 74/500.5 |
| 5,718,052 A * | 2/1998 | Taomo | F02B 63/02 30/276 |
| 5,842,277 A * | 12/1998 | Haberlein | F02D 11/02 173/171 |
| 5,868,377 A * | 2/1999 | Taomo | A01G 3/0535 251/294 |
| 6,006,627 A * | 12/1999 | Ikeda | F02D 11/02 74/531 |
| 6,021,757 A * | 2/2000 | Nagashima | F02D 11/04 123/400 |
| 6,218,633 B1 * | 4/2001 | Okumura | H01H 9/061 200/321 |
| 6,610,946 B2 | 8/2003 | Covell et al. |
| 6,871,623 B2 * | 3/2005 | Ohsawa | F02M 1/02 123/179.18 |
| 8,872,049 B2 | 10/2014 | Yuan |
| 9,540,993 B2 * | 1/2017 | Enriquez | F02D 41/064 |
| 2002/0153237 A1 * | 10/2002 | Covell | H01H 9/06 200/321 |
| 2005/0011491 A1 * | 1/2005 | Muller | A01D 34/82 123/398 |
| 2006/0219218 A1 * | 10/2006 | Yuasa | F02D 11/02 123/198 DB |
| 2013/0161161 A1 * | 6/2013 | Parrinello | B25F 5/00 200/43.17 |
| 2015/0113815 A1 * | 4/2015 | McRoberts | B23D 51/01 30/392 |
| 2016/0332287 A1 * | 11/2016 | Chen | B25B 21/00 |
| 2019/0047125 A1 * | 2/2019 | Junkers | B25B 21/00 |
| 2019/0150688 A1 * | 5/2019 | Bylund | A47L 5/14 |
| 2021/0304975 A1 * | 9/2021 | Fujihara | H01H 13/08 |

* cited by examiner

POWER TOOL

CROSS-REFERENCE

The present application claims priority to CN patent application Ser. No. CN201811581478.2 filed on Dec. 24, 2018, the contents of which is fully reflected herein.

TECHNICAL FIELD

The present invention relates to a power tool, and in particular to powered blower.

BACKGROUND ART

A speed regulating mechanism is provided on the handle of the existing powered blower to adjust the rotational speed of the motor. The speed regulating mechanism comprises a speed regulating switch and a switch trigger matched with the speed regulating switch, the speed regulating switch is equipped with a pressing portion, and the deeper the pressing stroke of the pressing portion, the higher the rotational speed of the motor, the switch trigger is pivotally mounted on the handle. When the operator presses one end of the switch trigger, the other end of the switch trigger abuts against the pressing portion, thereby adjusting the pressing stroke of the pressing portion, to realize the speed regulation of the motor.

In practical applications, users often need to limit the minimum speed of the motor and the minimum air volume according to the application. The existing powered blower is equipped with a knob on one side of the handle, and the user can adjust the speed limit of the motor by rotating the knob. Such design may cause inconvenience to the user when the user is accustomed to operate at the other side; in addition, the acceleration function needs to be realized by operating another acceleration button, which makes the operation cumbersome.

In view of this, it is indeed necessary to provide a power tool to solve the above problems.

SUMMARY OF INVENTION

The object of the present invention is to provide a power tool which can not only achieve a constant speed, but also can adjust the knob on the left and right sides of the handle, which is convenient for the operator to operate by left/right hand and ensures the easy operation.

To achieve the above objectives, the present invention provides a power tool comprising a housing, a motor housed in the housing, and a handle formed on the housing, the handle being provided with a speed regulating mechanism for adjusting the rotational speed of the motor, and a speed limiting mechanism cooperating with the speed regulating mechanism, wherein said speed limiting mechanism comprises a first knob and a second knob disposed on two sides of the handle, said first knob and said second knob are interlocked with each other to be toggled to limit said motor to operate at a fixed rotational speed.

In some embodiments, said first knob is provided with a rib member protruding toward the second knob and a slot formed on the rib member, and said second knob is provided with a connecting structure protruding into the rib member and a bar protruding outwardly from the connecting structure, said bar being latched and received in said slot, so that said first knob and said second knob are mutually linked.

In some embodiments, said rib member comprises a first arm disposed in an arc shape, a second arm spaced apart from the first arm, and a third arm disposed in a straight line connecting the first arm and the second arm, said first arm, said second arm and said third arm cooperate with each other such that a cross section of the rib member is D-shaped, and said slot is disposed on said third arm.

In some embodiments, said connecting structure is disposed in a D-shape, and said bar is formed to protrude outward from a straight side of the D-shaped connecting structure.

In some embodiments, said speed limiting mechanism further comprises a micro switch housed in said handle and located beside said second knob, and said second knob is further provided with a push rod formed from said connecting structure protruding outwardly, and when said push rod triggers said micro switch, said motor runs at a maximum speed.

In some embodiments, said speed limiting mechanism further comprises a torsion spring for engaging said first knob, said first arm of said first knob comprising a limiting arm protruding in a radial direction of said first knob, and when the push rod triggers the micro switch, one of the swing arms of the torsion spring is fixed to the housing, and the other swing arm of the torsion spring pressing against said limiting arm.

In some embodiments, said speed regulating mechanism comprising a speed regulating switch for adjusting the rotational speed of said motor, and a switch trigger coupled with said speed regulating switch and pivotally mounted on said handle, said speed regulating switch is provided with a pressing portion, and said switch trigger comprises a pivoting portion mounted on said handle, and a push arm and an abutting arm located on both sides of said pivoting portion which rotates around the pivoting portion, said abutting arm abuts said pressing portion to adjust the rotational speed of said motor.

In some embodiments, said pivoting portion is a shaft hole, and said handle is provided with a pivoting shaft that cooperates with said shaft hole.

In some embodiments, said housing comprises a first housing coupled to said first knob and a second housing coupled to said second knob, said speed regulating mechanism is received in a receiving cavity defined by said first housing and said second housing.

In some embodiments, a first positioning portion is disposed on a side of said first knob toward the first housing, and a second positioning portion is disposed on said first housing, said first positioning portion and said second positioning portion cooperate with each other such that said first knob switches and keeps constant speed between three speed positions.

The beneficial effects of the present invention are: the power tool of the present invention has a first knob and a second knob respectively disposed on the left and right sides of the handle, and the first knob and the second knob are interlocked with each other, so that the motor can be restricted to work at a fixed speed when the first knob or the second knob is toggled, which is convenient for the operator to operate by left/right hand and ensures the easy operation.

DESCRIPTION OF EMBODIMENTS

In order to make the objects, technical solutions and advantages of the present invention more clearly, the present invention will be described in detail below with reference to the drawings and specific embodiments.

Figure 1:
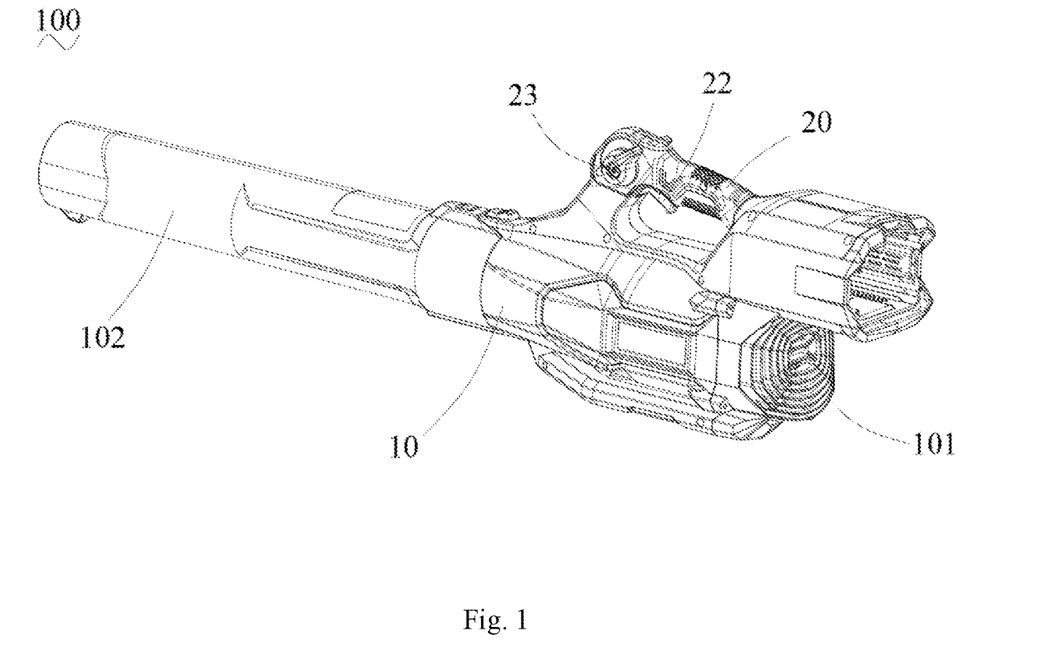
FIG. 1 is a stereoscopic view of the power tool according to an embodiment of the present invention.

Referring to FIG. 1, the present invention discloses a power tool 100, which is preferably a powered blower. Said power tool 100 comprises a housing 10, a motor (not shown) housed in the housing 10, and a handle 20 formed on said housing 10. Said housing 10 is provided with an air inlet 101 and an air outlet duct 102. A fan (not shown) is provided on said motor, and said fan is driven by said motor to rotate, causing the air to draw from said air inlet 101 and blow the wind out of said air outlet duct 102.

In the present invention, the handle 20 is integrally formed with the housing 10, that is, the handle 20 belongs to a part of the housing 10; of course, in other embodiments, the handle 20 and the housing 10 may also be separately provided, and it is only required to assembly the handle 20 to the housing 10, which is not limited thereto.

Referring to FIG. 1 to FIG. 4, the housing 10 comprises a first housing 11 and a second housing 12, and a cavity is disposed in each of said first housing 11 and said second housing 12, so that when said first housing 11 and said second housing 12 are coupled to each other, not only the shell of the handle 20 but also a receiving cavity 13 can be formed.

Said handle 20 is provided with a speed regulating mechanism 22 for adjusting the rotational speed of the motor and a speed limiting mechanism 23 for cooperating with said speed regulating mechanism 22. Said speed regulating mechanism 22 comprises a speed regulating switch 221 for adjusting the rotational speed of the motor, and a switch trigger 222 that cooperates with said speed regulating switch 221 and is pivotally mounted on said handle 20. Said speed regulating switch 221 is housed in said receiving cavity 13 and comprises a pressing portion 2211. The deeper the pressing stroke of said pressing portion 2211 is, the higher the rotational speed of the motor is.

Figure 3:
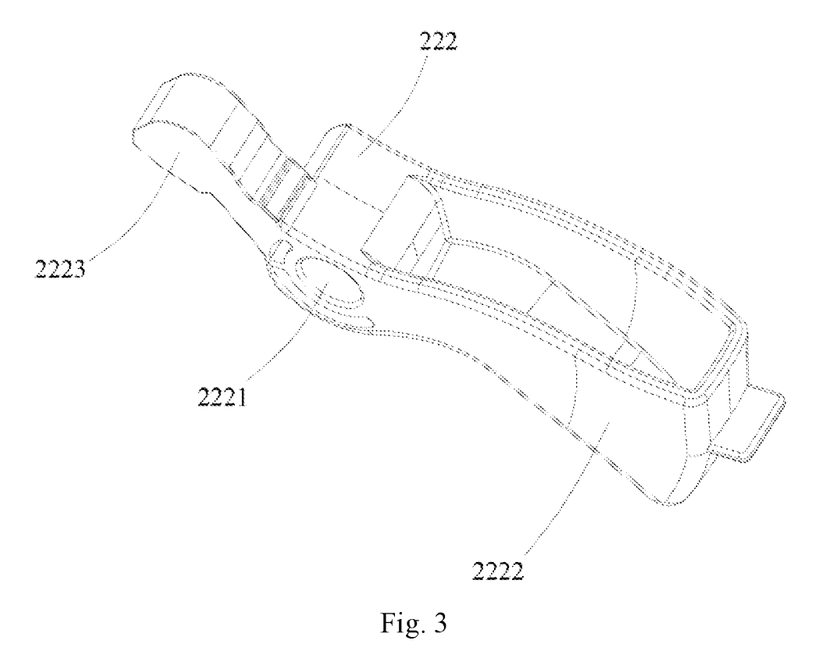
FIG. 3 is a stereoscopic view of the switch trigger shown in FIG. 2.

Said switch trigger 222 comprises a pivoting portion 2221 mounted on said handle 20, and a push arm 2222 and an abutting arm 2223 located respectively on two sides of said pivoting portion 2221 which rotates around the pivoting portion 2221. Specifically, the switch trigger 222 is fixed to the second housing 12 through said pivoting portion 2221, and the pivoting portion 2221 is received in said receiving cavity 13. In the embodiment, said pivoting portion 2221 is a shaft hole, and said second housing 12 is correspondingly provided with a pivoting shaft 121 that cooperates with the shaft hole, so as to be pivotally connected with the pivoting shaft 121 by the pivoting portion 2221 to allow said switch trigger 222 to rotate around the pivoting shaft 121.

In the present invention, said switch trigger 222 is integrally formed. Of course, in other embodiments, said switch trigger 222 can also be disposed in a separate form, and the switch trigger 222 can also be rotatably fixed on said second housing 12 in other forms, as long as it meets the function of said switch trigger 222, which is not limited herein.

Said push arm 2222 is at least partially located outside said receiving cavity 13 for the user to push said push arm 2222. Said abutting arm 2223 is located in said receiving cavity 13 and abuts said pressing portion 2211 to adjust the rotational speed of the motor. When the user pushes said push arm 2222, said push arm 2222 drives said abutting arm 2223 to rotate around said pivoting shaft 121, thereby making said pressing portion 2211 to change the pressing stroke under the pressing of said abutting arm 2223, to achieve the purpose of adjusting the rotational speed of the motor.

Specifically, said abutting arm 2223 has an initial position and an end position opposite to the initial position during the rotation, and said abutting arm 2223 has the smallest rotation amplitude when said abutting arm 2223 is in the initial position. At this time, the pressing stroke of said pressing portion 2211 is zero, the rotational speed of the motor is zero, the airflow amount of the power tool 100 is the smallest; when said abutting arm 2223 is at the end position, the rotation amplitude of said abutting arm 2223 is the largest. At this time, the pressing stroke of said pressing portion 2211 is the largest, said motor can output the maximum rotational speed, and the airflow amount of said power tool 100 is the largest.

Referring to FIG. 2, FIG. 5, FIG. 6 and FIG. 7, the speed limiting mechanism 23 comprises a first knob 231 and a second knob 232 which are respectively disposed on two sides of said handle 20. Said first knob 231 and said second knob 232 are interlocked with each other, so that when said first knob 231 or said second knob 232 is toggled, said motor can be restricted to operate at a fixed rotational speed.

Figure 5:
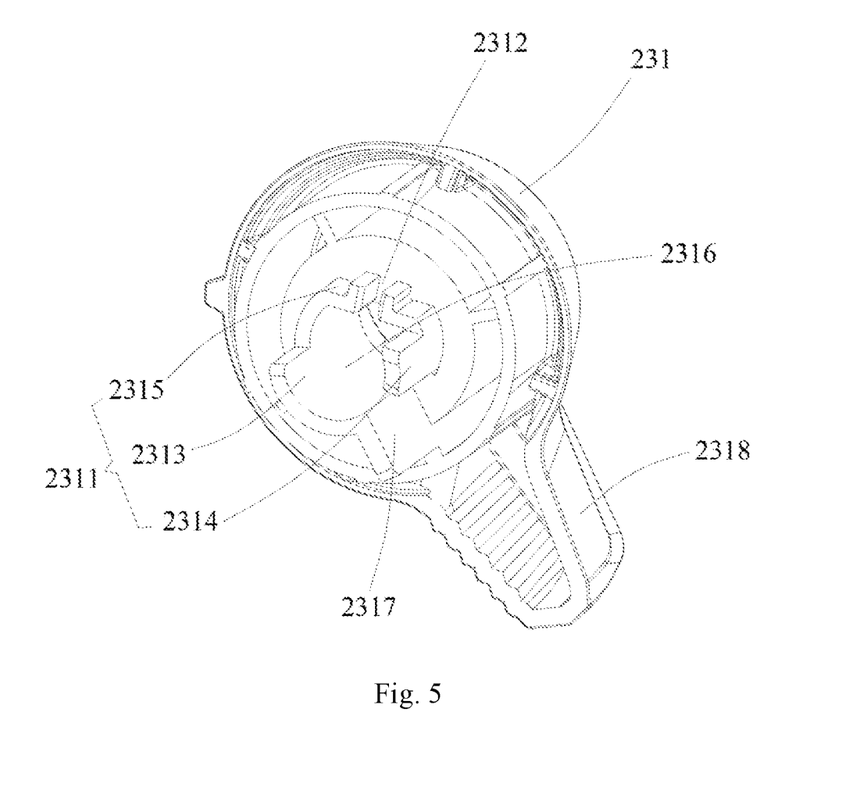
FIG. 5 is a stereoscopic view of the first knob shown in FIG. 2.

Said first knob 231 is provided with a rib member 2311 protruding toward said second knob 232 and a slot 2312 set on the rib member 2311. Said rib member 2311 comprises a first arm 2313 disposed in an arc shape, a second arm 2314 spaced apart from the first arm 2313, and a third arm 2315 disposed in a straight line connecting the first arm 2313 and the second arm 2314, said first arm 2313, said second arm 2314 and said third arm 2315 cooperate with each other such that a cross section of the rib member 2311 is D-shaped, and said slot 2312 is disposed on said third arm 2315.

Figure 6:
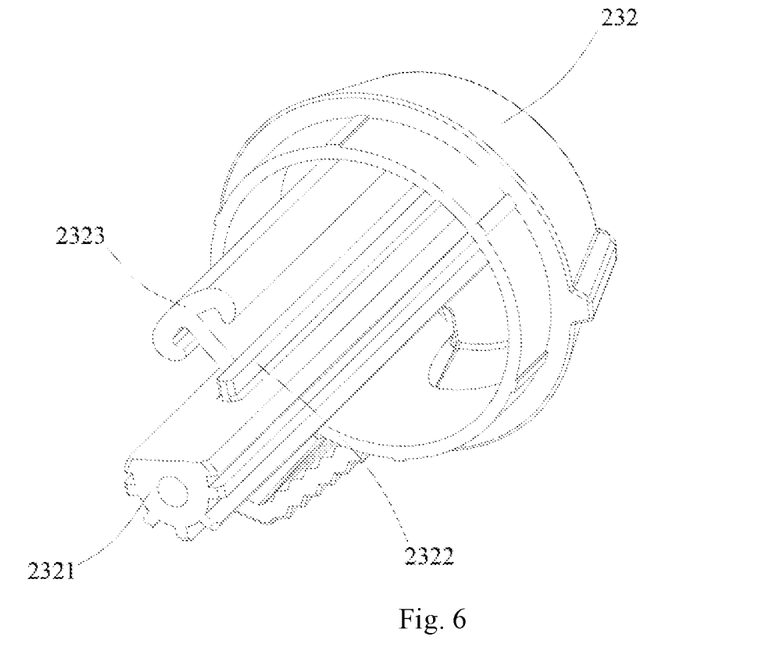
FIG. 6 is a stereoscopic view of the second knob shown in FIG. 2.

Said second knob 232 is provided with a connecting structure 2321 protruding into the rib member 2311 and a bar 2322 protruding outwardly from the connecting structure 2321, said bar 2322 being latched and received in said slot 2312, so that said first knob 231 and said second knob 232 are mutually linked. In this embodiment, said connecting structure 2321 is disposed in a D-shape, and said bar 2322 is formed to protrude outward from a straight side of the D-shaped connecting structure 2321.

Said first arm 2313, said second arm 2314, and said third arm 2315 are further disposed to form a receiving slot 2316. Said slot 2312 communicates with said receiving slot 2316, so that said first knob 231 and said second knob 232 are connected, said connecting structure 2321 is received in said receiving slot 2316, and said bar 2322 is restrained and received in said slot 2312, to realize the fixed connection and interlocking of said first knob 231 and said second knob 232.

Figure 7:
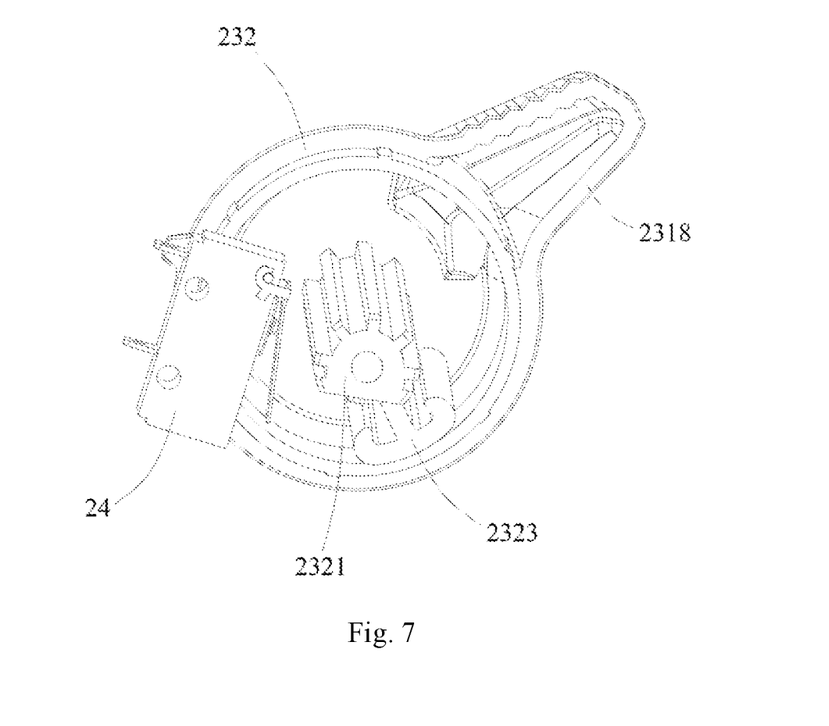
FIG. 7 is a positional relationship diagram of the second knob and the micro switch shown in FIG. 2.

Said speed limiting mechanism 23 further comprises a micro switch 24 and a torsion spring 25 housed in said receiving cavity 13, said micro switch 24 is disposed beside said second knob 232, and when said micro switch 24 is activated, said motor can be operated at a maximum speed; said torsion spring 25 is configured to cooperate with said first knob 231 to drive said first knob 231 and said second knob 232 to reset.

Figure 4:
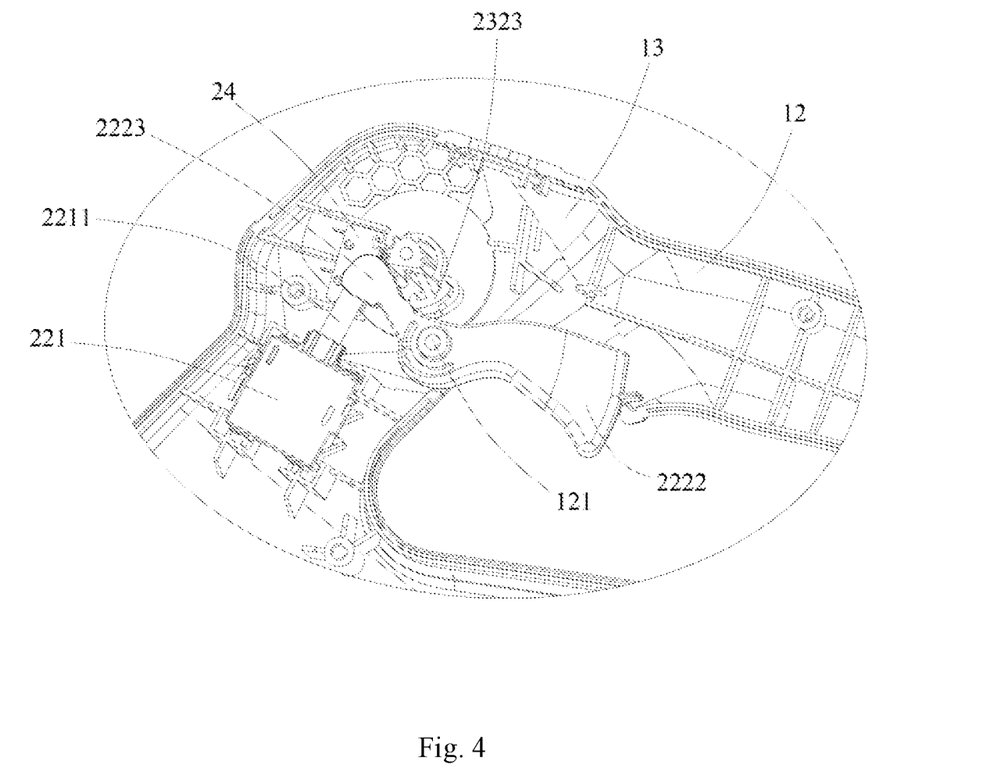
FIG. 4 is a partial stereoscopic view of the second knob shown in FIG. 2 when assembled to the second housing.

Specifically, said second knob 232 is further provided with a push rod 2323 formed from said connecting structure 2321 protruding outwardly, and when said push rod 2323 triggers said micro switch 24, said motor runs at a maximum speed. In addition, when the second knob 232 (or the first knob 231) is rotated, the push rod 2323 can also be used to press said switch trigger 222 to drive the switch trigger 222 rotate around the pivoting shaft 121, and then trigger the speed regulating switch 221 as shown in FIG. 4. Said first arm 2313 of said first knob 231 comprises a limiting arm 2317 protruding in a radial direction of said first knob 231, and when the push rod 2323 triggers the micro switch 24 to be on-state, one of the swing arms of the torsion spring 25 is fixed to the housing 10, and the other swing arm is pressing against said limiting arm 2317.

Figure 2:
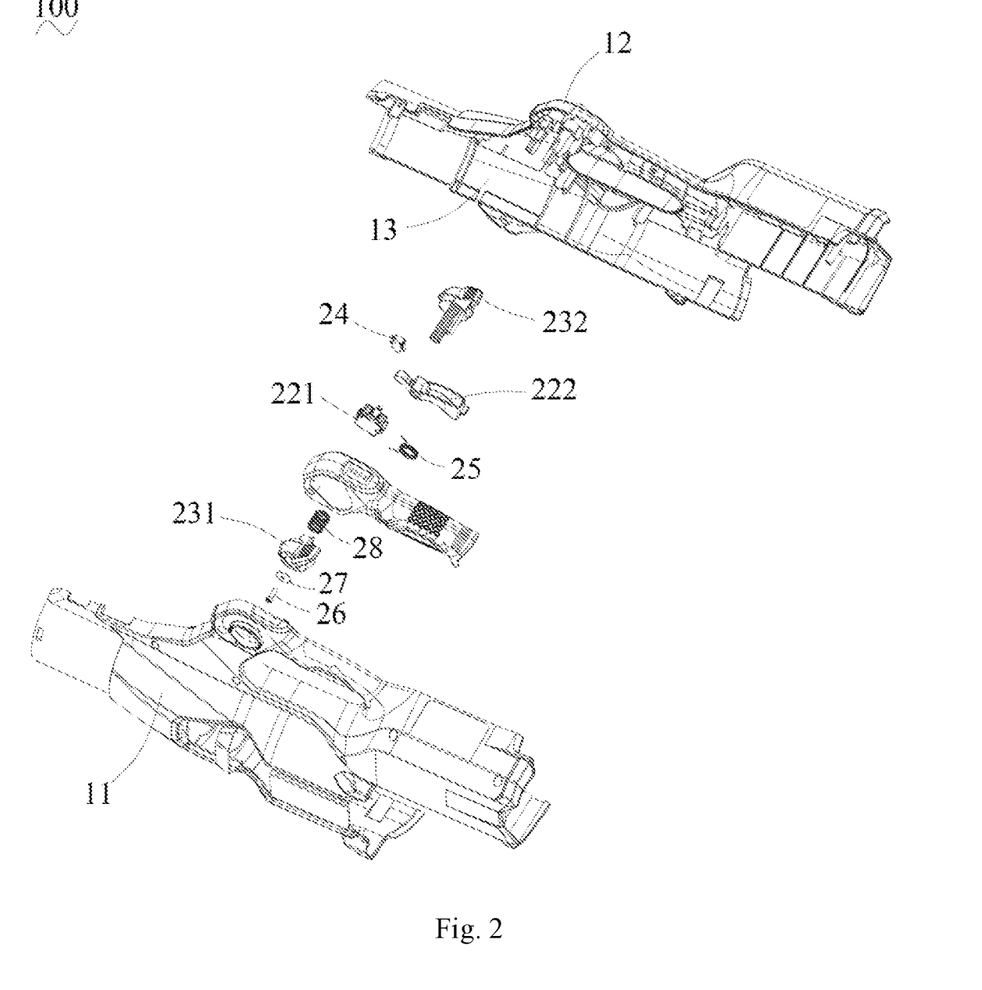
FIG. 2 is an exploded view of the speed regulating mechanism, the speed limiting mechanism and the housing shown in FIG. 1.
Figure 8:
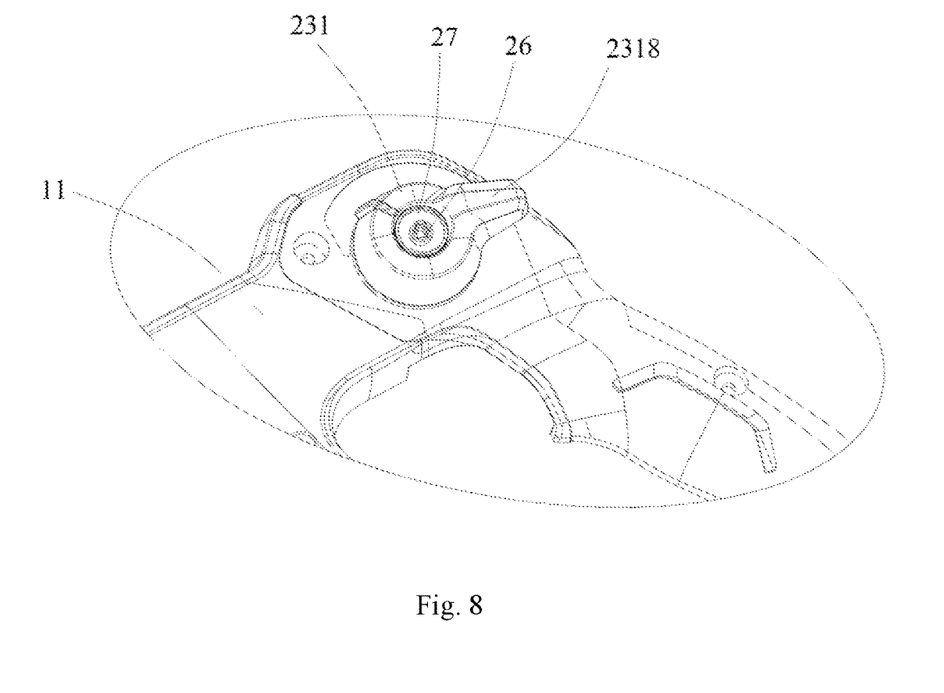
FIG. 8 is a partial stereoscopic view of the first knob shown in FIG. 2 when assembled to the first housing.
Figure 9:
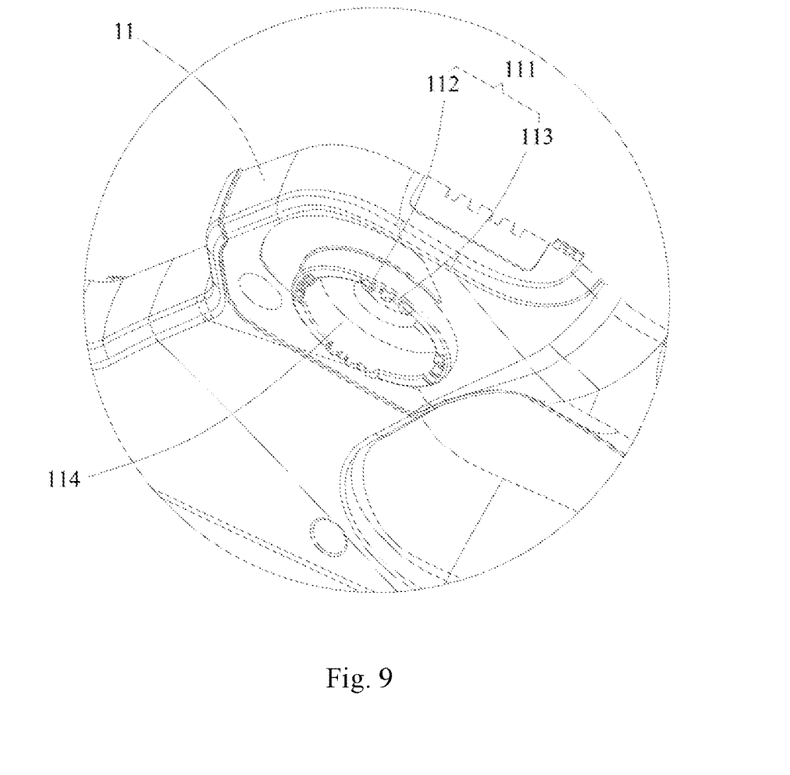
FIG. 9 is a partial enlarged view of the first housing shown in FIG. 2.

Referring to FIG. 8 and FIG. 9, as well as FIG. 2 and FIG. 4, said first housing 11 is connected to said first knob 231, and said second housing 12 is connected to said second knob 232, and said speed regulating switch 221, the micro switch 24, and the switch trigger 222 are all fixed in said second housing 12 to realize the mutual cooperation and linkage of the speed regulating switch 221, the micro switch 24, the switch trigger 222, and the second knob 232.

A first positioning portion (not shown in the figures) is disposed on one side of said first knob 231 toward the first housing 11, and a second positioning portion 111 is disposed on said first housing 11. Said first positioning portion and said second positioning portion cooperate with each other, therefore, on one hand, said first knob 231 can be prevented from rotating, and on the other hand, it is convenient for said first knob 231 to switch and keep constant speed between three speed positions. Preferably, the three speed positions are respectively the first speed position, the second speed position and the third speed position, and the first speed position corresponds to the lowest speed, and the third speed position corresponds to the highest speed.

Specifically, said second positioning portion 111 disposed on said first housing 11 comprises a plurality of first protrusions 112 protruding toward said first knob 231 and a positioning slot 113 disposed between the adjacent two first protrusions 112; said first positioning portion is disposed corresponding to the second positioning portion 111, comprising a second protrusion (not shown) that cooperates with said positioning slot 113, and said second protrusion is formed to protrude toward the first housing 11 from said first knob 231, and the second protrusion (first positioning portion) is retained in said positioning slot 113 (the second positioning portion 111); of course, in other embodiments, the first positioning portion and the second positioning portion 111 may also be disposed in other mutually-holding forms, said first protrusion 112 and said second protrusion may also be adjusted according to the holding form of the first positioning portion and the second positioning portion 111, that is, the specific forms and structures of the first positioning portion and the second positioning portion 111, the first protrusion 112 and the second protrusion are optional, and it is not limited here.

In the present invention, the numbers of the first protrusion 112 and the second protrusion can be respectively provided as three, so that the position of the second protrusion between the positioning slots 113 can be switched, so that the first knob 231 drives the second knob 232 to switch among three speed positions and maintain a constant speed at the corresponding speed position.

Of course, a first positioning portion and a second positioning portion can also be correspondingly disposed on said second knob 232 and said second housing 12, such that the second knob 232 drives the first knob 321 to switch among the three speed positions, and a constant speed is maintained at the corresponding speed position.

Each of said first knob 231 and said second knob 232 is provided with a boosting arm 2318 protruding in a radial direction thereof, and said boosting arm 2318 is correspondingly exposed to the outside of the first housing 11 and the second housing 12. So that the user rotates the first knob 231 and the second knob 232 by pushing said boosting arm 2318. Said boosting arm 2318 is provided with an anti-slip pattern.

An opening 114 is disposed on said first housing 11. Said first knob 231 extends through said first housing 11 from said opening 114 to be fixedly connected to the second knob 232. Said first knob 231 is also provided with a through hole (not labeled), so that a tapping screw 26 and a flat pad 27 are received in the through hole, and are riveted and fixed with the connecting structure 2321 of the second knob 232 to further strengthen linkage stability between the first knob 231 and the second knob 232.

Said first knob 231 is further sleeved with a compression spring 28, and said compression spring 28 is located between the first knob 231 and the first housing 11, so that when the first knob 231 is rotated, the compression spring 28 can control the matching gap between the first knob 231 and the first housing 11 by the deformation and adjust the magnitude of the rotational force when the first knob 231 is rotated, while avoiding hard friction between the first knob 231 and the first housing 11, extending the life of the first knob 231.

When using the power tool 100 according to an embodiment of the present invention, press the push arm 2222 firstly, to make said switch trigger 222 to rotate around the pivoting shaft 121 and trigger the speed regulating switch 221, and the power tool 100 is started; then, control the rotating speed of the motor according to actual needs and rotate the first knob 231 or the second knob 232 to the corresponding speed position. At this time, the push rod 2323 is abutted against the switch trigger 222 to limit the operation of the motor at a constant speed. When the first knob 231 and the second knob 232 are rotated beyond the third speed position, the push rod 2323 of the second knob 232 slides to the end of the abutting arm 2223 and triggers the micro switch 24 to realize the acceleration function (it means that, the motor runs at the maximum speed), at this time, the limiting arm 2317 of the first knob 231 abuts against one of the swing arms of the torsion spring 25, so that the torsion spring 25 is compressed. When the first knob 231 or the second knob 232 is released, the torsion spring 25 rebounds to the third speed position under the action of its own restoring force, to realize the automatic reset function, and at the same time, the first knob 231, the second knob 232 and the switch trigger 222 are also reset to the third speed position. When it is necessary to stop running, it is only necessary to swing the first knob 231 or the second knob 232 to the initial position.

This shows that the acceleration can only be realized by rotating the first knob 231 or the second knob 232, and can only be realized by continuing to rotate the first knob 231 or the second knob 232 after reaching the third speed position, the switch trigger 222 can only be rotated to the third speed position.

In conclusion, the power tool 100 according to embodiments of the present invention has a first knob 231 and a second knob 232 respectively disposed on the left and right sides of the handle 20, and the first knob 231 and the second knob 232 are interlocked with each other, so that the motor can be restricted to work at a fixed speed when the first knob 231 or the second knob 232 is toggled, which is convenient for the operator to operate backhand and is more convenient to operate. In addition, the power tool 100 according to embodiments of the present invention can be applied at different rotational speeds in different environments, with advantages of appropriately saving power consumption, prolonging running time, and convenient and comfortable operation.

The above embodiments are only used to illustrate the technical solutions of the present invention, not for limitation. Although the present invention is described in detail with reference to the preferred embodiments, ordinary technicians in the field should understand that the technical solutions of the present invention may be modified or substituted without departing from the spirit and scope of the technical solutions of the present invention.

The invention claimed is:

1. A power tool comprising a housing, a motor housed in the housing, and a handle formed on the housing, the handle being provided with a speed regulating mechanism for adjusting the rotational speed of the motor, and a speed limiting mechanism cooperating with the speed regulating mechanism, wherein said speed limiting mechanism comprises a first knob and a second knob disposed on two sides of the handle, said first knob is provided with a rib member protruding toward the second knob and a slot formed on the rib member, and said second knob is provided with a connecting structure protruding into the rib member and a bar protruding outwardly from the connecting structure, said bar being latched and received in said slot, so that said first knob and said second knob are interlocked with each other to be toggled to limit said motor to operate at a fixed rotational speed.

2. The power tool according to claim 1, wherein said rib member comprises a first arm disposed in an arc shape, a second arm spaced apart from the first arm, and a third arm disposed in a straight line connecting the first arm and the second arm, said first arm, said second arm and said third arm cooperate with each other such that a cross section of the rib member is D-shaped, and said slot is disposed on said third arm.

3. The power tool according to claim 2, wherein said connecting structure is disposed in a D-shape, and said bar is formed to protrude outward from a straight side of the D-shaped connecting structure.

4. The power tool according to claim 2, wherein said speed limiting mechanism further comprises a micro switch housed in said handle and located beside said second knob, and said second knob is further provided with a push rod formed from said connecting structure protruding outwardly, and when said push rod triggers said micro switch, said motor runs at a maximum speed.

5. The power tool according to claim 4, wherein said speed limiting mechanism further comprises a torsion spring for engaging said first knob, said first arm of said first knob comprising a limiting arm protruding in a radial direction of said first knob, and when the push rod triggers the micro switch, one of the swing arms of the torsion spring is fixed to the housing, and the other swing arm of the torsion spring pressing against said limiting arm.

6. The power tool according to claim 1, wherein said speed regulating mechanism comprising a speed regulating switch for adjusting the rotational speed of said motor, and a switch trigger coupled with said speed regulating switch and pivotally mounted on said handle, said speed regulating switch is provided with a pressing portion, and said switch trigger comprises a pivoting portion mounted on said handle, and a push arm and an abutting arm located on both sides of said pivoting portion which rotates around the pivoting portion, said abutting arm abuts said pressing portion to adjust the rotational speed of said motor.

7. The power tool according to claim 6, wherein said pivoting portion is a shaft hole, and said handle is provided with a pivoting shaft that cooperates with said shaft hole.

8. The power tool according to claim 1, wherein said housing comprises a first housing coupled to said first knob and a second housing coupled to said second knob, said speed regulating mechanism is received in a receiving cavity defined by said first housing and said second housing.

9. The power tool according to claim 8, wherein a first positioning portion is disposed on a side of said first knob toward the first housing, and a second positioning portion is disposed on said first housing, said first positioning portion and said second positioning portion cooperate with each other such that said first knob switches and keeps constant speed between three speed positions.

* * * * *